US010816878B2

(12) United States Patent
Miller

(10) Patent No.: US 10,816,878 B2
(45) Date of Patent: Oct. 27, 2020

(54) ELECTRONIC DEVICE PRIVACY COVER

(71) Applicant: Kameron Miller, Manhattan Beach, CA (US)

(72) Inventor: Kameron Miller, Manhattan Beach, CA (US)

(*) Notice: Subject to any disclaimer, the term of this patent is extended or adjusted under 35 U.S.C. 154(b) by 0 days.

(21) Appl. No.: 15/884,308

(22) Filed: Jan. 30, 2018

(65) Prior Publication Data

US 2019/0369462 A1 Dec. 5, 2019

Related U.S. Application Data

(63) Continuation-in-part of application No. 15/848,658, filed on Dec. 20, 2017, now abandoned.

(60) Provisional application No. 62/452,136, filed on Jan. 30, 2017.

(51) Int. Cl.
*G03B 17/00* (2006.01)
*G03B 11/04* (2006.01)

(52) U.S. Cl.
CPC .......... *G03B 11/045* (2013.01); *G03B 11/041* (2013.01)

(58) Field of Classification Search
USPC ....................................................... 396/448
See application file for complete search history.

(56) References Cited

U.S. PATENT DOCUMENTS

| 7,581,893 | B2 * | 9/2009 | Miramontes | G03B 17/00 396/448 |
| D669,112 | S * | 10/2012 | Gustaveson | G03B 11/041 D16/237 |
| 8,471,956 | B2 * | 6/2013 | Fortmann | G06F 1/1613 348/373 |
| 8,724,020 | B1 * | 5/2014 | Haddad | H04N 5/2254 348/375 |
| D708,657 | S * | 7/2014 | Gustaveson | D16/250 |
| D764,474 | S * | 8/2016 | Penn | D14/440 |
| D782,562 | S * | 3/2017 | Gustaveson, II | D16/237 |
| D816,149 | S * | 4/2018 | Dalton | D16/237 |
| 10,070,021 | B1 * | 9/2018 | Rolle | G03B 11/041 |
| D839,946 | S * | 2/2019 | De Vries | D16/237 |
| 10,317,776 | B2 * | 6/2019 | Gustaveson, II | H04N 5/2254 |
| D859,387 | S * | 9/2019 | Chung | D14/250 |
| D863,410 | S * | 10/2019 | Laemle | D16/237 |
| D864,279 | S * | 10/2019 | Wang | D16/237 |
| 2005/0047773 | A1 * | 3/2005 | Satake | H04M 1/0214 396/301 |
| 2006/0077287 | A1 * | 4/2006 | Koshu | G09F 3/0292 348/376 |
| 2007/0242948 | A1 * | 10/2007 | Miramontes | G03B 17/00 396/448 |
| 2007/0269202 | A1 * | 11/2007 | Forsyth-Martinez | G03B 11/00 396/429 |
| 2011/0058255 | A1 * | 3/2011 | Weiss | H04M 1/0264 359/511 |

(Continued)

*Primary Examiner* — Rodney E Fuller
(74) *Attorney, Agent, or Firm* — Richard B. Cates

(57) ABSTRACT

A cover device is configured to be secured to an electronic device to obstruct the camera lens of a digital camera of the electronic device. The cover device may have a movable cover tab configured to be rotated and/or slid over the camera lens and rotated and/or slid off of the camera lens. The cover device may have adhesive such as pressure sensitive and/or electrostatic adhesive by which the cover device is secured to the electronic device.

18 Claims, 8 Drawing Sheets

(56) References Cited

U.S. PATENT DOCUMENTS

| | | | | |
|---|---|---|---|---|
| 2011/0099908 A1* | 5/2011 | Fortmann | G06F 1/1613 | 49/373 |
| 2011/0182029 A1* | 7/2011 | Wu | G06F 1/1686 | 361/679.55 |
| 2012/0301132 A1* | 11/2012 | Mitskog | B32B 7/12 | 396/448 |
| 2013/0028591 A1* | 1/2013 | Hicks | G03B 41/00 | 396/544 |
| 2013/0088639 A1* | 4/2013 | Mundt | H04N 5/2251 | 348/372 |
| 2014/0102135 A1* | 4/2014 | German | A44C 5/0007 | 63/1.11 |
| 2014/0119718 A1* | 5/2014 | Oh | G03B 11/041 | 396/448 |
| 2014/0198439 A1* | 7/2014 | De Pietro | G06F 1/16 | 361/679.02 |
| 2014/0220269 A1* | 8/2014 | Ogufere Ogufere | B44C 5/005 | 428/34.1 |
| 2015/0059251 A1* | 3/2015 | Rinner | G06F 1/1656 | 49/465 |
| 2015/0163385 A1* | 6/2015 | Haddad | H04N 5/2254 | 348/374 |
| 2015/0236743 A1* | 8/2015 | Kennedy | H04B 1/3888 | 455/575.8 |
| 2015/0320167 A1* | 11/2015 | Nguyen | A45C 11/00 | 224/191 |
| 2016/0049979 A1* | 2/2016 | Grouwstra | H04B 1/3888 | 455/575.8 |
| 2016/0088264 A1* | 3/2016 | Freeze | H04N 5/2254 | 348/143 |
| 2016/0161830 A1* | 6/2016 | Gonzalez Sanchez | G06F 1/1686 | 396/448 |
| 2016/0266472 A1* | 9/2016 | Terry | G03B 11/041 | |
| 2017/0329206 A1* | 11/2017 | Gustaveson, II | H04N 5/2254 | |
| 2018/0123631 A1* | 5/2018 | Hessabi | H04B 1/3888 | |
| 2019/0033686 A1* | 1/2019 | Kinoshita | G06F 1/1686 | |
| 2019/0138737 A1* | 5/2019 | Leipold | G06F 21/83 | |
| 2019/0204526 A1* | 7/2019 | Deng | G02B 7/00 | |
| 2019/0272005 A1* | 9/2019 | Wickett | G06F 1/1607 | |

* cited by examiner

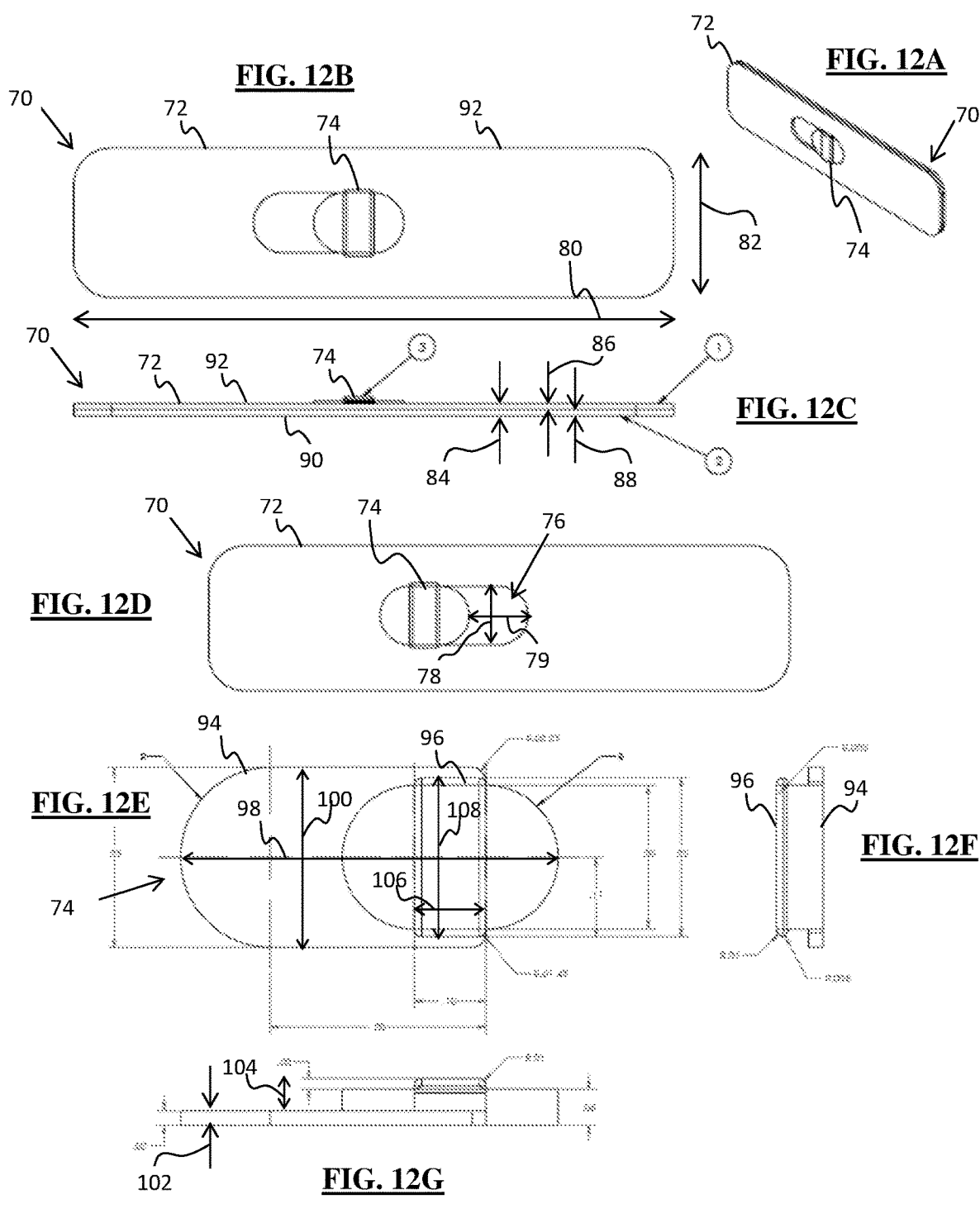

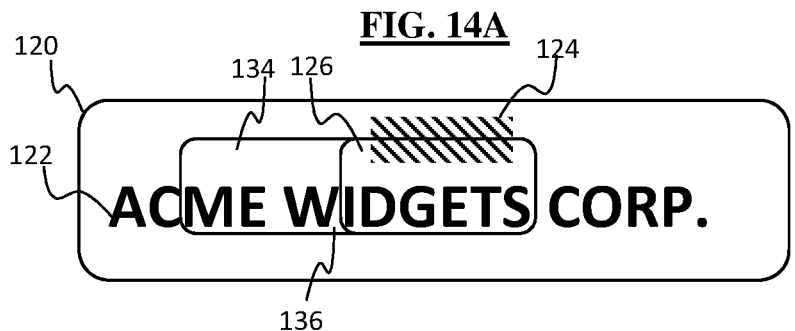
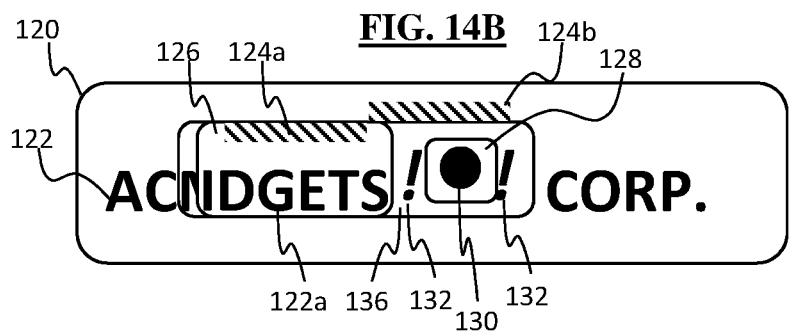
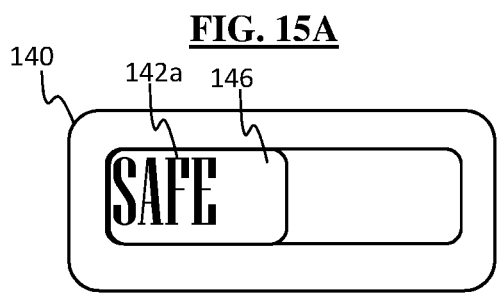
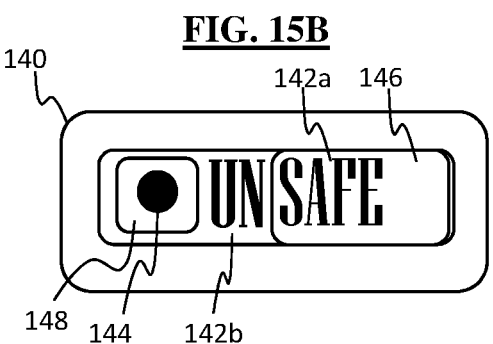
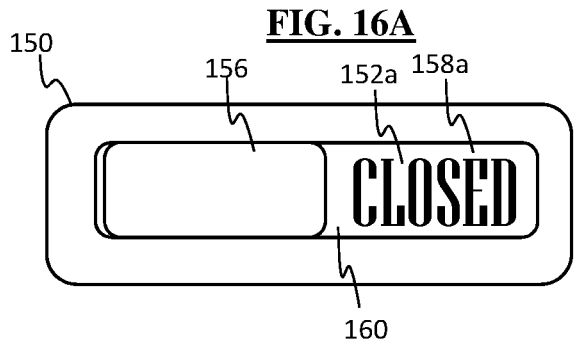
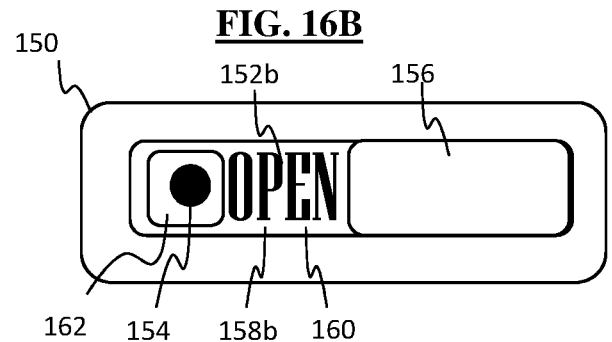

ELECTRONIC DEVICE PRIVACY COVER

RELATED APPLICATIONS

This application claims priority from U.S. Provisional Patent Application No. 62/452,136, filed Jan. 30, 2017 and entitled "Cell Phone Privacy Cover," and from U.S. Utility patent application Ser. No. 15/848,658, filed Dec. 20, 2017 and entitled "Cell Phone Privacy Cover," the entire contents of each of which are incorporated herein by reference.

FIELD OF THE INVENTION

The invention relates to smart cell phones and other electronic devices having digital cameras, and more specifically to removable lens covers for such electronic devices.

BACKGROUND OF THE INVENTION

Many everyday electronic devices, including cell phones and tablets and personal computers, have built-in digital cameras. These digital cameras can be activated by a user, but can also be activated by internal software (including malware). If an electronic device is compromised by malware, the digital camera can be activated without the knowledge of the user. Still photos and video can secretly be taken by the digital camera and uploaded wirelessly (e.g., via an internet connection) to a remote device under the control of a $3^{rd}$ party (such as a $3^{rd}$ party responsible for the malware).

A reliable and hack-proof method for preventing secret photography/videography by an internal camera is to provide a physical cover for the camera lens which the user can activate and also view to confirm that the lens is blocked. Some electronic devices such as some personal computers have a built-in physical lens cover. However, a great many electronic devices, and especially cell phones, lack such covers.

What is needed is the capability for a subject/user to manually block photographic/video capabilities of any digital camera without permanent modification to the electronic device, while further enabling the subject/user to confirm visually that the digital camera's photo and video capabilities are deactivated. The current invention meets this need.

SUMMARY OF THE INVENTION

The invention includes devices, systems, and methods for preventing the taking of photos of a user by a digital camera.

Devices according to the invention comprise a removable cover sized and configured to cover the lens of a digital camera. The cover may preferably be of a low profile which does not interfere with the usage of the electronic device by the user. The cover may preferably have a small tab or notch via which a user can easily engage the cover in order to move the cover between the open and closed configurations.

A cover device according to an embodiment of the invention for insuring privacy of a digital camera of an electronic device has a cover body having a back side and a front side; a camera opening adjacent or partially/fully surrounded by the cover body; an adhesive on at least a portion of the back side of the cover body; and a cover tab movably secured to the cover body and configured to be moved from a closed configuration wherein the cover tab covers the camera opening and an open configuration wherein the cover tab does not visually obstruct the camera opening. The adhesive may be a pressure sensitive adhesive. The adhesive may be an electrostatic adhesive.

The cover tab may be rotatably secured to the cover body, such as via a hinge-like connection. The cover tab may be slidingly secured to the cover body via rail-like elements. The cover tab may comprise a substantially circular element configured to cover a camera lens, and may have a diameter between 3 and 15 millimeters. The cover device may have a camera opening positioned on a side of the cover body. The cover body may extend from away from the camera opening along opposing sides of the camera opening. The cover body may have a width between 3 millimeters and 15 millimeters, and/or a length between 5 millimeters and 30 millimeters. The cover base may have a width between 8 millimeters and 20 millimeters, and/or a length between 40 millimeters and 60 millimeters.

A cover device according to an embodiment of the invention may have a cover body having a back side and a front side, wherein the cover body has a width between 2 and 10 millimeters and a length between 2 and 10 millimeters; and an adhesive on at least a portion of the back side of the cover body.

The adhesive may be a pressure sensitive adhesive which leaves no residue behind when the cover device is applied and then removed from a smooth surface of a camera lens. The adhesive may be an electrostatic adhesive. The cover device may be substantially circular (i.e., with the length substantially equal to the width thereof). The cover device may have a maximum thickness between the front side and the back side of less than 1 millimeter.

The cover base may be flexible and/or the cover tab may be relatively rigid. The cover base may be formed from PVC (polyvinyl chloride), and/or the cover tab may be formed from ABS (acrylonitrile butadiene styrene).

A method according to an embodiment of the invention for insuring privacy comprises providing an electronic device having a digital camera and camera lens; identifying the camera lens; providing a cover device having a back side with adhesive element thereon; and securing the cover device to the electronic device at a position over and/or adjacent the camera lens via the adhesive element.

The cover device may have a moving cover tab configured to be movably position over a camera opening of the cover device, and securing the cover device to the electronic device may include positioning the cover device with the camera opening over the camera lens of the electronic device. The method may further comprise moving the cover tab from an open configuration where the cover tab does not visually obstruct the camera opening and camera lens to a closed configuration where the cover tab visually obstructs the camera opening and camera lens. The method may comprise moving the cover tab from the closed configuration where the cover tab visually obstructs the camera opening and camera lens to the open configuration where the cover tab does not visually obstruct the camera opening and camera lens; and taking photos and/or videos with the digital camera. Securing the cover device to the electronic device may comprise blocking the camera lens with the cover device. The method may comprise removing the cover device from the electronic device to uncover the camera lens; and taking photos and/or videos with the digital camera. After removing the cover device from the electronic device to uncover the camera lens, the cover device may be repositioned onto the electronic device at a position away from the camera lens, and secured to the electronic device at the position away from the camera lens such that the camera lens is visually unobstructed by the cover device.

A method of using devices according to the invention may include providing an electronic device having a digital camera and camera lens; identifying the camera lens; providing a cover device having a back side with adhesive element thereon; and securing the cover device to the electronic device at a position over and/or adjacent the camera lens via the adhesive element. The cover device may include a cover base and a moving cover tab, wherein the cover tab may be configured to move with respect to the cover base, wherein the cover tab may be configured to be movably position over a camera opening of the cover device, and securing the cover device to the electronic device may include positioning the cover device with the camera opening over the camera lens of the electronic device. The method may further include moving the cover tab from an open configuration where the cover tab does not visually obstruct the camera opening and camera lens to a closed configuration where the cover tab visually obstructs the camera opening and camera lens. The method may include moving the cover tab from the closed configuration where the cover tab visually obstructs the camera opening and camera lens to the open configuration where the cover tab does not visually obstruct the camera opening and camera lens; and taking photos and/or videos with the digital camera.

The electronic device may have a curved surface, and the cover base may have a flexible portion configured to flex to a radius of curvature matching or coming close to the curvature of the electronic device curved surface and the adhesive may be configured to hold the cover base flexible portion in a desired curvature. The cover base flexible portion may be configured to flex to a radius of curvature of 2 inches or less, and the adhesive may be configured to hold the cover base flexible portion in the radius of curvature of 2 inches or less when the cover base is applied via the adhesive to the curved surface of the electronic device. Securing the cover device to the electronic device may include flexing the flexible portion of the cover base to conform to the curved surface of the electronic device, and flexing the flexible portion of the cover base may comprise flexing the flexible portion to a radius of curvature of 2 inches or less. Note that other radii of curvature for the cover base flexible portion are also within the scope of the invention, including 1 inch or less, 0.5 inches or less, 0.25 inch or less; and the adhesive may be configured to hold the cover base in those various radii of curvature when the cover base is applied via the adhesive to a curved surface of an electronic device. Flexing the flexible portion of the cover base may comprise flexing the flexible portion to the radii of curvature set forth herein.

Securing the cover device to the electronic device may involve flexing the flexible portion of the cover base to conform to the curved surface of the electronic device.

The methods, systems, and devices of the invention are set forth in part in the description which follows, and in part will be obvious from the description, or can be learned by practice of the methods, devices, and systems. The advantages of the methods, devices, and systems will be realized and attained by means of the elements and combinations particularly pointed out in the appended claims. It is to be understood that both the foregoing general description and the following detailed description are exemplary and explanatory only and are not restrictive of the methods, devices, and systems as claimed.

BRIEF DESCRIPTION OF THE DRAWINGS

FIGS. 12A-12C depict perspective, front, and side views of a device according to an embodiment of the invention;

FIG. 12D depicts a front view of the device of FIGS. 12A-12C in an open configuration;

FIGS. 12E-12G depict front, side, and end views of a sliding cover element of the device of FIGS. 12A-12D;

FIGS. 13A-13B depict end views of a device according to an embodiment of the invention;

FIGS. 14A-14B depict front views of a device in closed (FIG. 14A) and open (FIG. 14B) configurations according to an embodiment of the invention;

FIGS. 15A and 15B depict front views of a device in closed (FIG. 15A) and open (FIG. 15B) configurations according to an embodiment of the invention; and FIGS. 16A and 16B depict front views of a device in closed (FIG. 16A) and open (FIG. 16B) configurations according to an embodiment of the invention.

DETAILED DESCRIPTION OF PREFERRED EMBODIMENTS OF THE INVENTION

Figure 1A:
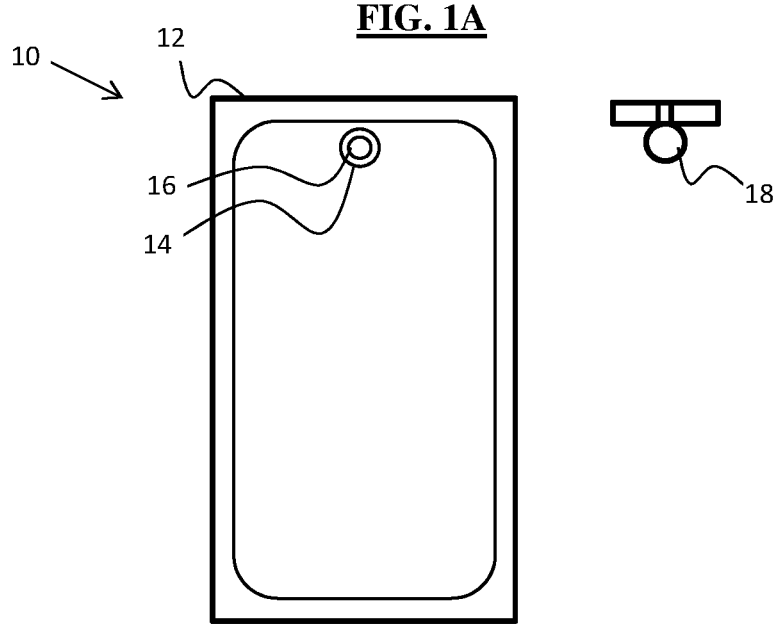
FIGS. 1A and 1B depicts a system according to an embodiment of the invention.
Figure 1B:
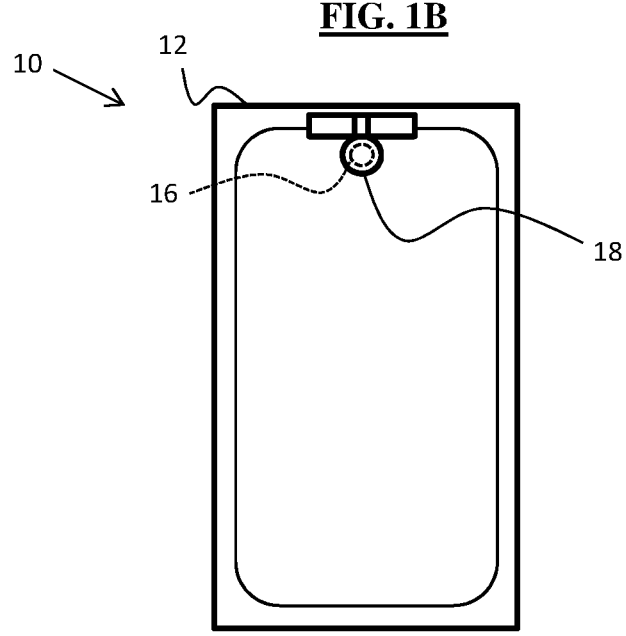

FIGS. 1A-1B depict a system 10 comprising an electronic device 12 (such as a smart phone) having a digital camera (not shown) with a lens 14 with a lens front 16. A cover 18 can be secured to the electronic device 12 at a position over the lens front 16 to thereby prevent the digital camera from taking video or still images. With the cover 18 in place with an opaque portion thereof over the lens front 16, a user can visually confirm that the digital camera is prevented from taking such video/photos.

To use the cover 18 to assure privacy, a user can provide an electronic device 12, identify the camera lens 14 and lens front 16 of the electronic device 12, remove any protective covering that may have covered an adhesive layer of the cover device (such as by peeling the covering off the adhesive layer), position the cover 18 over the camera lens 14, and press the cover 18 onto electronic device 12 over and/or adjacent the camera lens 14 (which may include positioning a camera opening of the cover 18 over the camera lens 14). For a clip-on cover device 18, instead of pressing the cover onto the camera lens the device is instead clipped onto the electronic device so as to be positioned over the camera lens. If the cover 18 requires activation (e.g., via sliding or rotating a cover tab as in FIGS. 2A-7D below), the user can activate the cover 18 (e.g., slide and/or rotate and/or otherwise move a cover tab to a closed position) to obstruct the camera lens. To permit use of the camera, the user can remove the cover 18 from over/adjacent the camera lens 14, and/or slide/rotate/otherwise move a cover tab of the cover 18 from over the camera lens 14. Once the use of the camera is completed and the user desires to assure privacy again, the user can reposition the cover device 18 and/or cover tab over the camera lens 14.

As depicted in greater detail in FIGS. 2A-2D, a cover device 18 according to an embodiment of the invention has a cover front 20 and a cover back 22. A cover base 24 at least partially surrounds a camera opening 26. A cover tab 28 having a cover tab body 30 is secured via a hinge-like connection 32 to the cover base 24 at a position adjacent the camera opening 26.

In FIGS. 2A-2D, the cover tab 28 is in an open configuration. The cover tab 28 may be held in the open configuration via a snap-like mechanism 34, which in the embodiment depicted includes elements extending inward on the cover base 24 which apply pressure to sides of the cover tab 28 to hold it in place. The cover tab 28 may be held in the open configuration via such a snap-like mechanism 34 and/or adhesive and/or electrostatic charge. For example, a clean-release pressure sensitive adhesive and/or electrostatic charge may be provided on a front and/or back surface of the cover tab 28.

Figure 2A:
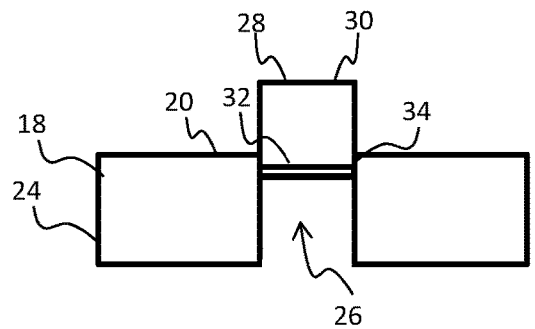
FIGS. 2A-2D depict front, back, top, and side views of a device in an open configuration according to an embodiment of the invention.
Figure 2B:
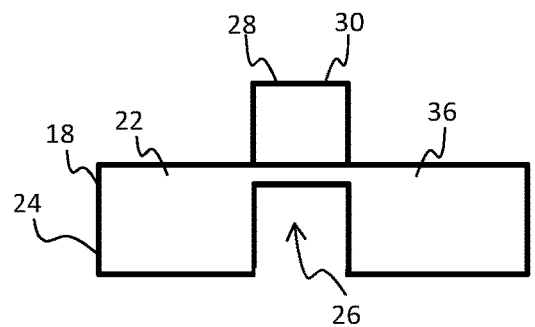
Figure 2C:
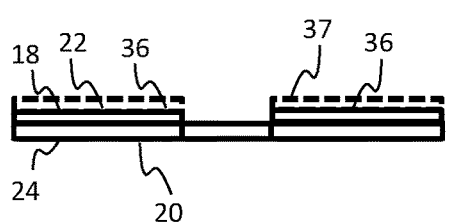
Figure 2D:
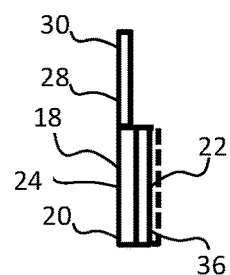
Figure 2E:
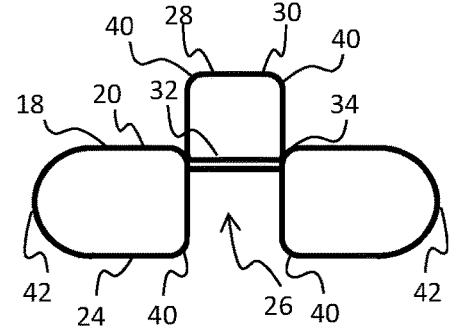
FIG. 2E depicts a front view of a modified version of the device of FIG. 2A according to an embodiment of the invention.
Figure 3A:
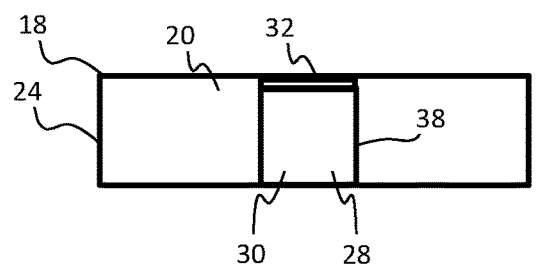
FIGS. 3A-3D depict front, back, top, and side views of the device of FIGS. 2A-2D in a closed configuration according to an embodiment of the invention.
Figure 3B:
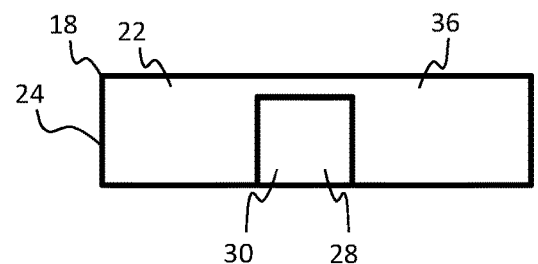
Figure 3C:
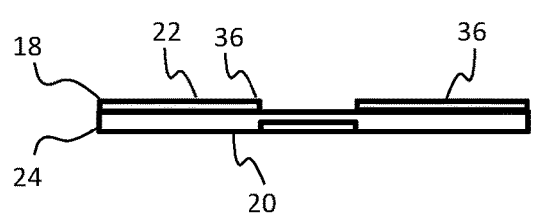
Figure 3D:
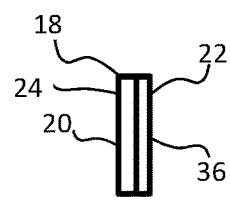
Figure 4A:
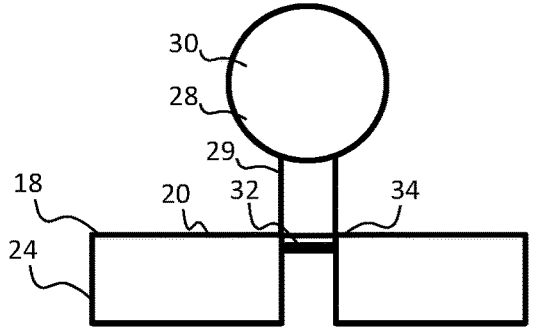
FIGS. 4A-4D depict front, back, top, and side views of a device in an open configuration according to an embodiment of the invention.
Figure 4B:
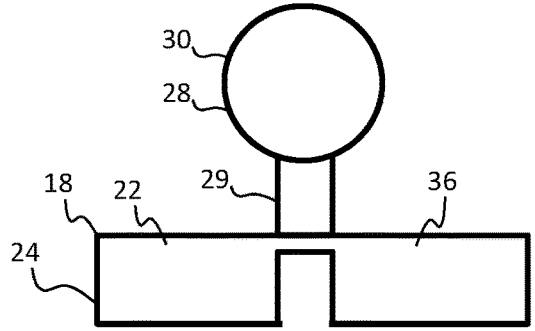
Figure 4C:
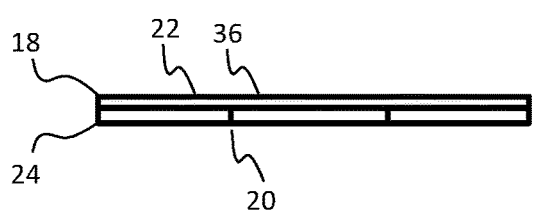
Figure 4D:
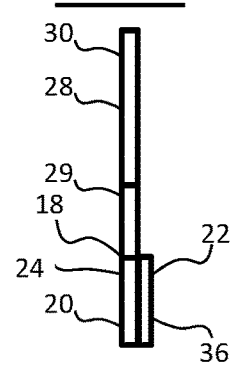
Figure 5A:
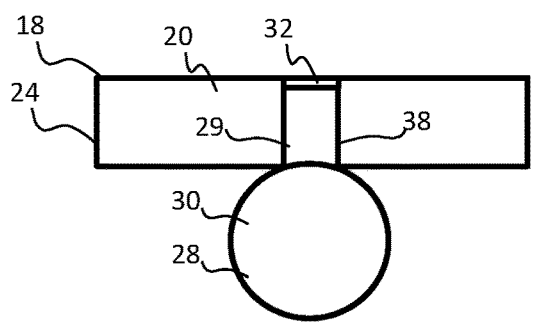
FIGS. 5A-5D depict front, back, top, and side views of the device of FIGS. 4A-4D in a closed configuration according to an embodiment of the invention.
Figure 5B:
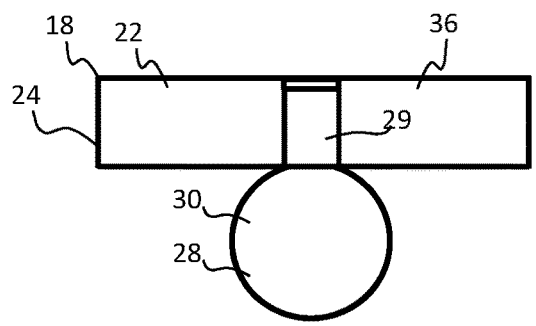
Figure 5C:
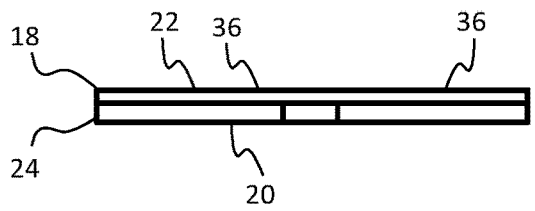
Figure 5D:
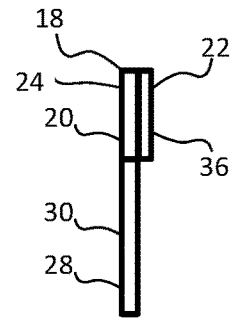
Figure 6A:
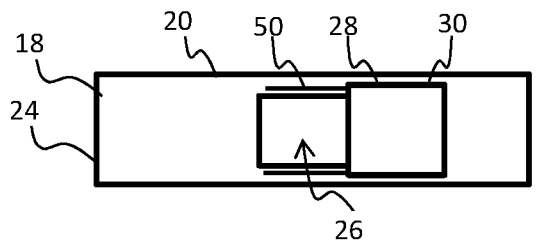
FIGS. 6A-6D depict front, back, top, and side views of a device in an open configuration according to an embodiment of the invention.
Figure 6B:
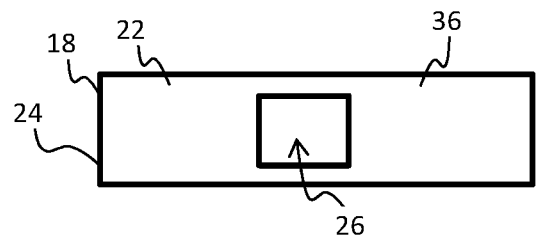
Figure 6C:
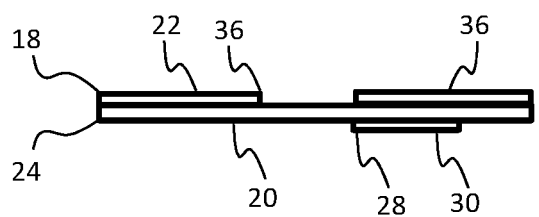
Figure 6D:
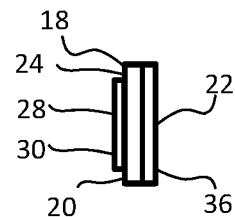
Figure 7A:
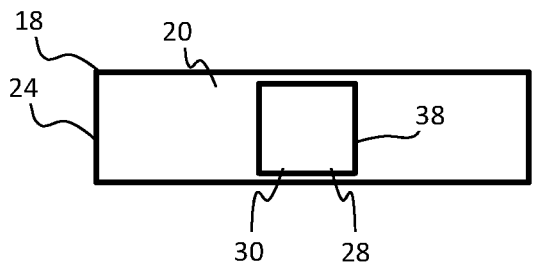
FIGS. 7A-7D depict front, back, top, and side views of the device of FIGS. 6A-6D in a closed configuration according to an embodiment of the invention.
Figure 7B:
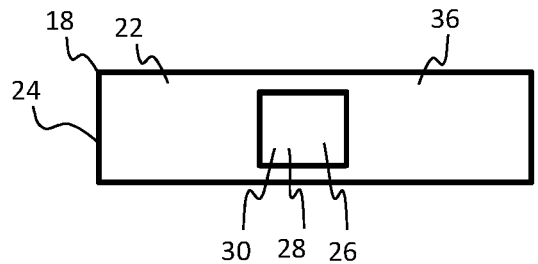
Figure 7C:
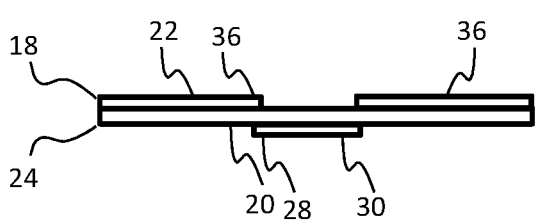
Figure 7D:
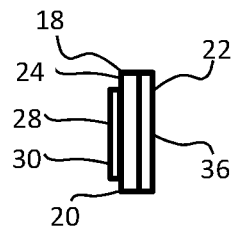

The cover device 18 includes adhesive 36 or other securing element on the back thereof, and specifically on the back area of the base portion 24, which permits a user to secure the cover device 18 to an electronic device with the camera opening 26 positioned over the camera lens so that photos can be taken through the camera opening 26 when the cover tab 28 is in the open position. The adhesive 36 or other securing element may preferably be a clean release adhesive (e.g., pressure sensitive and/or electrostatic) which, when the cover 18 is pulled off of the electronic device, does not leave any residue on the electronic device. A peel-off covering 37 or other protective covering may cover the adhesive/electrostatic layer 36 until ready for use, so that a user may peel off the covering 37 to reveal the adhesive/electrostatic layer 36. Note that corners 40 and even entire end portions 42 of the cover device 18 may be rounded so as to prevent snagging, as depicted in FIG. 2E. Additionally (or alternatively), edges may be beveled and/or rounded to prevent snagging.

In this and other embodiments of the invention, the cover base 24 and cover tab 28 may be formed of various materials and have various colors (or be transparent), according to a particular application. For example, tempered glass and/or plastic may be used. The cover base 24 and/or cover tab 28 may preferably be of relatively rigid material such as tempered glass and/or polycarbonate. The cover base 24 and/or cover tab 28 may be transparent (except for the cover tab body 30, which may preferably be opaque) in order to better match an electronic device to which the cover 18 is applied. The cover base 24 and/or cover tab 28 may have a color (such as white, black, or silver) which matches the color of electronic devices to which the cover 18 may be applied. Note that when the cover tab 28 is in the open configuration the exposed side of the cover tab body 30 may have a color which contrasts with the electronic device and/or may bear an indicia (e.g., a bright color such as red which does not match the electronic device and/or other portions of the cover 18, and/or a warning signal, and/or an emoji), which alerts and reminds a user that the cover tab 28 is in the open configuration. Note that the structural portion (i.e., cover base 24, cover tab 28) may preferably be substantially planar and thin (e.g., 1 mm or less) in order to fit in an unobtrusive manner onto the surface of a smart phone or tablet.

As depicted in FIGS. 3A-3D, the cover tab 28 can be rotatably moved (i.e., rotated via the hinge connection 32) to a closed configuration so that the cover tab body 30 covers the camera opening 26, and thus blocks the camera lens of an electronic device to which the cover 18 may be secured. The cover tab 28 may be held in the closed configuration via a snap-like mechanism 38, which in the embodiment depicted includes elements extending inward on the cover base 24 adjacent the opening 26 which apply pressure to sides of the cover tab 28 to hold it in the closed configuration.

The cover tab body 30 may be very thin, but its length and width must be sufficient to cover and obscure a camera lens. In some embodiments of the invention, the cover tab body 30 may have a minimum radial dimension (i.e., the lesser of the length or the width, or diameter for a circular tab body) of 0.5 cm; 0.75 cm; 1 cm; 1.5 cm; between 0.5 and 2 cm; between 0.5 and 1.5 cm; between 1 and 2 cm; etc. The minimum radial dimension is determined by factors such as the electronic device to which the cover is to be applied and/or the digital camera lens to be covered by the cover tab body.

FIGS. 4A-4D depict an embodiment of the invention where a cover device 18 has a cover front 20 and a cover back 22. A cover base 24 is positioned at one side of the cover device 18, with a camera opening 26 adjacent the cover base 24 so that the cover base 24 can be positioned adjacent a camera lens (not shown) so that the camera opening 26 is over the camera lens. A cover tab 28 having a cover tab arm 29 and cover tab body 30 is secured via a hinge-like connection 32 to the cover base 24. In FIGS. 4A-4D, the cover tab 28 is in an open configuration. The cover tab 28 may be held in the open configuration via a snap-like mechanism or other mechanism and/or adhesive and/or electrostatic charge. For example, a clean-release pressure sensitive adhesive and/or electrostatic charge may be provided on a front and/or back surface of the cover tab arm 29 and/or cover tab body 30. Note that the cover tab body 30 may preferably be free of adhesive and/or electrostatic charge, so that the adhesive and/or electrostatic charge is provided only on the cover tab arm 29 and cover base 24. This may prevent adhesive and/or static buildup on the lens which might obscure the lens view.

The cover device 18 includes adhesive 36 or other securing element on the back thereof, and specifically on the back area of the base portion 24, which permits a user to secure the cover device 18 to an electronic device with the camera opening 26 positioned over the camera lens so that photos can be taken through the camera opening 26 when the cover tab 28 is in the open position. The adhesive 36 or other securing element may preferably be a clean release adhesive (e.g., pressure sensitive and/or electrostatic) which, when the cover 18 is pulled off of the electronic device, does not leave any residue on the electronic device. A peel-off covering (not shown) or other protective covering may cover the adhesive until ready for use. Corners and/or ends may be rounded, and/or edges may be beveled or rounded, in order to prevent snagging.

FIGS. 5A-5D depict the device of FIGS. 4A-4D in the closed configuration, where the cover tab 28 is rotatably moved (i.e., rotated via the hinge connection 32) to a closed configuration so that the cover tab body 30 covers the camera opening 26, and thus blocks the camera lens of an electronic device to which the cover 18 may be secured. The cover tab 28 may be held in the closed configuration via a snap-like or other mechanism.

The cover tab body 30 may have a minimum radial dimension (i.e., diameter and/or length/width) of 0.5 cm; 0.75 cm; 1 cm; 1.5 cm; between 0.5 cm and 2 cm; between 0.5 cm and 1 cm; between 1 cm and 2 cm; between 1 cm and 1.5 cm, etc. The minimum radial dimension is determined by factors such as the electronic device to which the cover is applied and/or the digital camera lens to be covered by the cover tab body.

In a further embodiment of the invention depicted FIGS. 6A-6D, a cover device 18 according to an embodiment of the invention has a cover tab 28 slidably secured to the cover base 24 via tracks 50. In FIGS. 6A-6D, the cover tab 28 is slidingly positioned in an open configuration so that the camera opening 26 is uncovered. The cover tab 28 may be held in the open configuration via a snap-like and/or friction-lock or other mechanism.

The cover device 18 of FIGS. 6A-6D includes a front side 20 and back side 22, and may have adhesive 36 such as pressure sensitive adhesive on the back thereof, and specifically on the back area of the base portion 24 to permit a user to secure the cover device 18 to an electronic device with the camera opening 26 positioned over the camera lens so that photos can be taken through the camera opening 26 when the cover tab 28 is in the open position. A peel-off covering (not shown) or other protective covering may cover the adhesive until ready for use. Corners and/or ends may be rounded, and/or edges may be beveled or rounded, in order to prevent snagging. As depicted in FIGS. 7A-7D, the cover tab 28 can be slidably moved (i.e., slid with respect to the cover base 24 and camera opening 26) to a closed configuration so that the cover tab body 30 covers the camera opening 26 to thereby the camera lens of an electronic device to which the cover 18 may be secured. The cover tab 28 may be held in the closed configuration via a snap-like and/or friction and/or other mechanism (not shown).

Various dimensions of devices are within the scope of the invention. For example, devices such as those depicted in FIGS. 2A-7D may have overall lengths of 5 to 30 millimeters; 10 to 20 millimeters; 1.5 centimeters; 2 centimeters; etc. Dimensions may vary according to the particular use: for example, a cover for a smart phone may be 1.5 cm in length, whereas a cover for a tablet or personal computer may be 2 cm in length; a cover tab for a smart phone may be 1 cm in minimum radial dimension (i.e., length or width or diameter), whereas a cover tab for a tablet or personal computer may be 1.5 cm in minimum radial dimension (i.e., length or width or diameter). Devices may have overall thicknesses of 2 mm or less or even 1 mm or less.

Figure 8A:
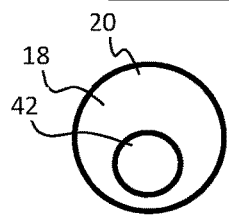
FIGS. 8A-8D depict front, back, top, and side views of a device according to an embodiment of the invention.
Figure 8B:
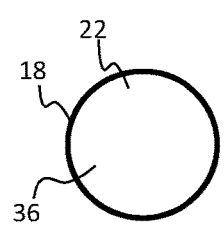
Figure 8C:
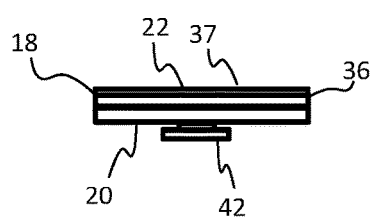
Figure 8D:
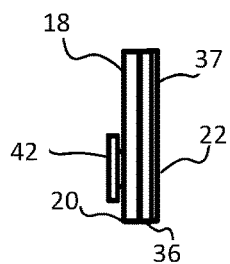

In another embodiment of the invention depicted in FIGS. 8A-8D, a cover device 18 is sized and configured to cover a camera lens. The cover 18 has a front side 20 and back side 22. A small finger tab 24 or other grasping/engagement element is included via which a user can easily grasp or otherwise engage the cover 18 (e.g., using a fingernail to pry under the finger tab 24 or other grasping/engaging element in order to life the cover device 18 at least partially off of the electronic device). Note that the small finger tab 24 or other grasping/engagement element may be positioned off-center, such as toward an edge thereof as depicted in FIGS. 8A and 8D, in order to facilitate easier lifting of the near edge away from the electronic device surface. The back side 22 includes an adhesive 36 (e.g., electrostatic and/or magnetic and/or pressure-sensitive adhesive) or other securing element with which the cover 18 can be secured to the electronic device to cover the camera lens. The adhesive 36 may cover the entire portion of the back side 22 as depicted in FIG. 8B, or only a portion thereof (such as the horseshoe-shaped adhesive portion 36 depicted in FIG. 8E). The adhesive 36 may preferably be a clean release adhesive which, when the cover 18 is pulled off of the camera lens, does not leave any residue which might obscure the view of the camera lens. A peel-off covering 37 or other protective covering may cover the adhesive until ready for use. To use the cover 18, a user can provide an electronic device, identify the camera lens of the electronic device, remove the protective covering 37 (such as by peeling the covering off the adhesive layer 36), position the cover 18 over the camera lens, and press the cover 18 and adhesive 36 onto the camera lens to thereby cover the camera lens. To remove the device, the user can grasp the cover 18 (such as by grasping the tab 24), and pull the cover 18 off the camera lens. To store the cover 18 when the camera is being used, the user can secure to the cover 18 to another portion of the electronic device (e.g., a smooth surface adjacent to but not obstructing the camera lens). Once the use of the camera is completed and the user desires to assure privacy again, the user can reposition the cover 18 over the camera lens. The cover 18 may have a minimum radial dimension (i.e., diameter and/or length/width) of 0.5 cm; 0.75 cm; 1 cm; 1.5 cm; between 0.5 cm and 2 cm; between 0.5 cm and 1 cm; between 1 cm and 2 cm; between 1 cm and 1.5 cm, etc. The minimum radial dimension is determined by factors such as the electronic device to which the cover is applied and/or the digital camera lens to be covered by the cover tab body.

Figure 8E:
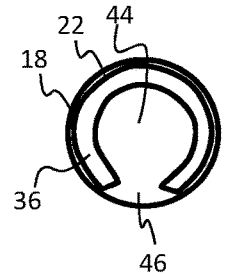
FIG. 8E depicts a back view of a modified version of the device of FIG. 8B according to an embodiment of the invention.
Figure 9A:
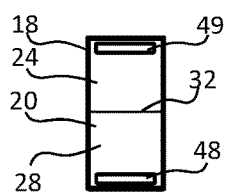
FIGS. 9A-9D depict front, back, side, and top views of a device according to an embodiment of the invention.
Figure 9B:
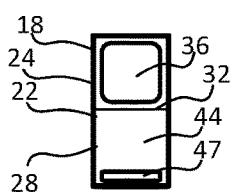
Figure 9C:
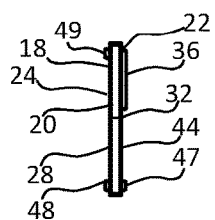
Figure 9D:
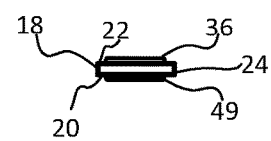
Figure 10A:
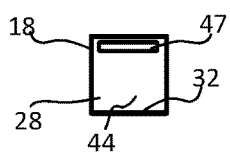
FIGS. 10A-10D depict front, back, side, and top views of the device of FIGS. 9A-9D in an open/uncovered configuration according to an embodiment of the invention.
Figure 10B:
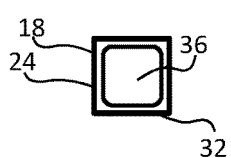
Figure 10C:
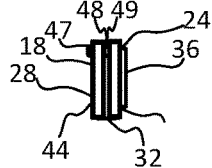
Figure 10D:
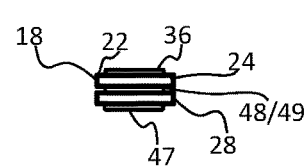

As depicted in FIG. 8E, the adhesive 36 may only cover a portion of the back side 22, leaving an open area 44 thereof free of adhesive. The open area 44 may be sized to accommodate the lens area of the digital camera, so that then the cover 18 is applied to the electronic device the adhesive area 36 (e.g., the horseshoe-shaped region 36 depicted in FIG. 8E) does not cover the camera lens. In this way, even if some residual adhesive remains on the electronic device after removal of the cover 18, that residual adhesive will be off to the side of the camera lens instead of over the camera lens. In the embodiment of FIG. 8E, the adhesive 36 is positioned adjacent the perimeter edges of the cover back 22 except for the edge area 46 immediately adjacent the lower and open area of the horseshoe-shaped adhesive area 36. The adhesive-covered perimeter areas secure the cover securely to an electronic device, while the open edge area 46 makes it easier to lift the cover edge that is closest to that open edge area 46.

FIGS. 9A-9D depict a further embodiment of the invention, where a cover device 18 has a cover base 24 connected to a cover tab 28 via a hinge 32. Adhesive 36 (magnetic/electrostatic/pressure sensitive adhesive) is on the back of the cover base 24 to secure the cover base 24 to an electronic device. The cover tab 28 may have an adhesive section 47 that can hold the cover tab 28 against the electronic device in a closed position. The cover tab 28 may have an open area 44 that is free of adhesive, with the open area 44 sized and shaped to cover the camera lens and the adhesive section 47 sized and shaped and positioned on the tab 28 such that the adhesive section 47 is on the far side of the camera lens from the cover base 24 when the cover tab 28 is in the "lens closed/covered" position of FIGS. 9A-9D, with the tab 28 extending over the camera lens of an electronic device to which the cover device 18 is secured. To cover a camera lens to ensure privacy, the cover device 18 is secured to an electronic device with the cover base 24 secured to the electronic device via the adhesive 36 at a position to the side of a camera lens of the device, with the cover tab 28 extending over and across the camera lens with the cover tab adhesive section 47 on the far side of the camera lens from the cover base 24.

FIGS. 10A-10D depict the cover of FIGS. 9A-9D in the "lens open/uncovered" configuration, with the cover tab 28 folded along the hinge 32 against the cover base 24 to uncover a camera lens. To move the device from the lens open/uncovered configuration to the lens closed/covered configuration, the user lifts the free edge of the cover tab 28 and folds the cover tab 28 against the cover base 24, with the folding occurring along the hinge 32. The cover tab 28 may be secured against the cover base 24 via interaction between a cover tab connector 48 and a cover base connector 49, which when pressed together are held together via mechanical interaction and/or adhesion such as magnetic/electrostatic/pressure sensitive adhesive, etc. The cover tab connector 48 and/or cover base connector 49 may comprise mechanical locking mechanisms (which mechanically engage/lock to each other) and/or magnets (e.g., both connectors are magnets, or one connector is a magnet and the other is made of magnetically-attractive metal such as steel, etc.) and/or electrostatic and/or pressure sensitive adhesives, etc.

Figure 11A:
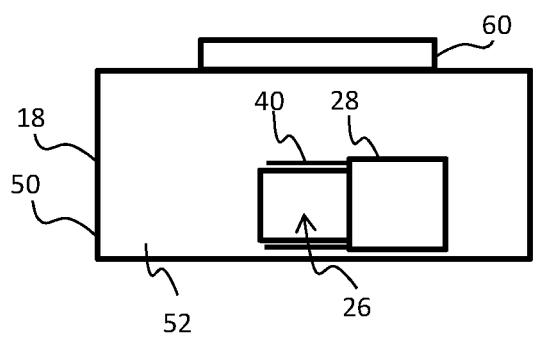
FIGS. 11A-11C depict front, back, and side views of a device according to an embodiment of the invention.
Figure 11B:
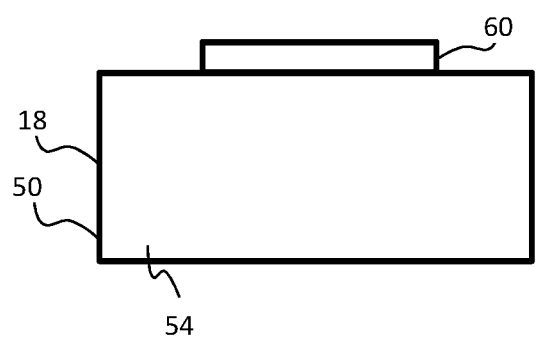
Figure 11C:
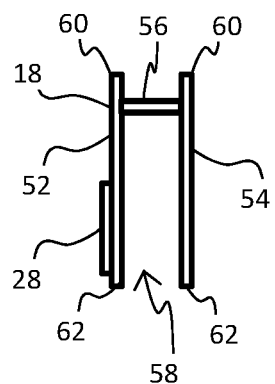

Another embodiment of the invention depicted in FIGS. 11A-11C comprises a cover device 18 having a clip-like cover body 50 having a front segment 52, back segment 54, and a middle segment 56 connecting the front and back segments 52, 54 to define an electronic-device-receiving opening 58 configured to receive an edge of an electronic device therein. The clip-like cover body 50 is configured to be clipped onto an edge of the electronic device with a portion of the front segment 52 positioned over the camera lens of the electronic device. The front segment 52 may include a camera opening 26 and a movable cover tab 28 configured to be moved (e.g., slidingly or rotatably moved) between an open configuration wherein the camera opening 26 is visually unobstructed to a closed configuration wherein the camera opening 26 is visually obstructed. The clip-like cover body 50 may be biased (e.g., via spring-like and/or memory metal qualities) so that the free ends 62 of the front segment 52 and back segment 54 engage against each other when the cover body is unrestrained. Tabs 60 may be provided which when grasped and compressed toward each other by a user cause free ends of the front segment 52 and back segment 54 to move away from each other to thereby enlarge the opening 58 so that the cover device 18 can be slid over the edge of the electronic device. When the tabs 60 are released, the front segment 52 and back segment 54 compress the electronic device therebetween to hold the cover device 18 thereon. Corners and/or ends may be rounded, and/or edges may be beveled or rounded, in order to prevent snagging.

FIGS. 12A-12D depict a device 70 according to a further embodiment of the invention, with a cover base 72 and a sliding cover tab 74. The sliding cover tab 74 is positioned over an opening 76 in the cover base 72, with the opening 76 sized and configured to permit a camera lens of an electronic device to have a clear view through the opening 76 when the sliding cover tab 74 is slid to the open configuration, as depicted in FIG. 12D. For example, the opening 74 may have a width or diameter 78 of to 5 to 15 mm. The opening 74 may have a length 79 which is the same as or larger than the width 78. A larger length 79, such as a length from 10 mm to 40 mm, can provide sufficient room to permit the opening to accommodate not just the camera lens but also the flash of the electronic device. The cover base 72 may have a length 80 of 40 to 60 mm, a width 82 of 8 to 20 mm, and an overall thickness 84 of 1 to 3 mm. The overall thickness 84 may include the main body structure thickness 86 and the adhesive layer thickness 88. In one preferred embodiment, the length 80 is 45 to 55 mm (or 1.5 to 2.5 inches, or 2 inches), the width 82 is 10 to 15 mm (or 0.25 to 0.75 inches, or 0.5 inches), and the overall thickness 84 is 1 mm. Other dimensions are also within the scope of the invention, such as length 80 of 1.5 to 2.5 inches, 1.5 inches, 2 inches, at least 1 inch, less than 3 inches; all of which can be combined with width 82 of 0.25 to 0.75 inches, 0.4 to 0.6 inches, 0.5 inch, less than 1 inch, greater than 0.25 inch.

The cover base 72 may have an adhesive 90 on the back of the main body structure 92, such as a pressure-sensitive adhesive, by which the cover base 72 can be secured to an electronic device. Use of a pressure-sensitive adhesive can permit the device 70 to be positioned and then repositioned on the electronic device, for example if the user initially positions the device inappropriately on the electronic device. With the cover base 72 secured to an electronic device with the opening 76 positioned over the camera lens of the electronic device, a user can selectively cover and uncover the camera lens by sliding the sliding cover tab 74 from the closed (covered) configuration to the open (uncovered) configuration. Note that FIGS. 12A-12D are engineering drawings which are to scale among the respective drawings.

FIGS. 12E-12G depict further details of the sliding cover tab 74. The sliding tab cover 74 has tab body 94 with a tab knob 96. The tab knob 96 is configured to be engaged by a user's finger in order to push the sliding cover tab 74 from the open to the closed configuration and back. The sliding tab cover 74 may have various dimensions, depending on the particular application (e.g., overall cover device design/configuration, electronic device/camera lens configuration, etc.). For example, the tab body 94 may have a length 98 of 8 to 15 mm, width 100 of 5 to 8 mm, and thickness 102 of 0.5 to 2 mm. The tab body thickness 102 may correspond to or be smaller than the thickness of an adhesive layer of the device. The tab knob 96 may project from the tab body 94 a distance 104 of 1 to 2 mm, and may have a length 106 of 3 to 7 mm and a width 108 of 2 to 3 mm. Note that FIGS. 12E-12G are engineering drawings which are to scale among the respective drawings.

The cover base 72 (of this and the other embodiments of the invention) may preferably be at least somewhat flexible in order to conform to curved surfaces, such as confirming to an electronic device having a curved face around its camera lens. The flexibility may be limited, and may preferably permit the cover base main structure 72 to flex into a shallow curve having a radius of curvature 110 when viewed from the end as depicted in FIG. 13A, with the cover base held in the shallow curve by the pressure sensitive when the device is applied to a curved surface such as the surface of an electronic device having a curved face. For example, the cover base may be able to flex into a curve with radius of curvature 110 of 2 inches (5 cm) or less, 1 inch (2.5 cm) or less, 0.5 inch (1.3 cm) or less, 0.4 inch (1 cm) or less. The cover base 72 may be a relatively thin structure (e.g., at or about 0.05 inches/1 mm) which may be formed of PVC (polyvinyl chloride). The sliding cover tab 74 may preferably be relatively rigid (e.g., more rigid than that cover base 72). For example, the sliding cover tab 74 may be formed from ABS (acrylonitrile butadiene styrene). This combination of a somewhat flexible cover base 72 with more rigid sliding cover tab 74 provides a device 70 that can conform to moderate curves on an electronic device while having a sliding element which can be easily manipulated between open and closed (e.g., from closed to open and from open to closed) by a user.

The adhesive may contribute to the ability of a device of the invention to conform to curved or otherwise uneven surfaces. For example, a device main body (such as that depicted in FIG. 13A) may have a tendency to recoil from a curved shape back toward a flat shape. The adhesive may preferably be formulated to form a bond between the device main body and the surface of an electronic device, with the bond having sufficient strength to oppose the recoil of the device main body 72 and hold it in a desired curved shape (e.g., the radius of curvature 110 discussed above with respect to FIG. 13A) when applied to the electronic device (e.g., for a pressure-sensitive adhesive, applied by being pressed against the surface of the electronic device). The adhesive may also serve as a filler layer, such as in FIG. 13B, where a device main body 72 may be flat or form a slight curve (as depicted) which does not fully conform to a more defined curve of a surface 102 of an electronic device 100. The adhesive 90 may have sufficient thickness and/or ability to deform (e.g., under compression and/or tension) that it serves to fill in the areas between the device 70 and the surface 102 of the electronic device 100.

Devices according to the invention may include providing advertising and other imagery and/or text material on the front thereof. FIGS. 14A-14B depict front views of a device 120 in closed (FIG. 14A) and open (FIG. 14B) configurations, where a company name 122 and logo 124 (or other imagery, such as a picture) extend across the front of the device 120. Note that in the closed configuration of FIG. 14A, the company name 122 and logo 124 (or other imagery) are each complete, so that the company name can be read and the logo is complete and whole to a viewer. In the open configuration of FIG. 14B, where the cover portion 126 has been slid or otherwise moved away from the device opening 128 to uncover the camera lens 130, the company name 122 is broken up, with the company name portion 122a positioned on the cover portion 126 repositioned to cover other portions of the company name 122. Similarly, the company logo 124 (or other imagery) has been slid apart into two entirely separate portions, one on the now-displaced cover portion 124a and one on the main base unit 124b.

Devices and methods according to the invention may include the use of warning imagery/text to warn a user that the device is in the open or closed configuration. For example, as depicted in FIGS. 14A-14B, opening or closing the cover portion 126 of the device 120 may involve breaking up of imagery and/or text printed on the device 120, with the broken imagery/text serving as an indicator/warning to the user that the device 120 is not actively covering the camera lens. Other warning indicia may be used, such as indicia which is revealed when the cover portion 126 is slid to the open configuration. For example, as shown in FIG. 14B, when the cover portion 126 is in the open configuration, warning signals 132 are revealed, which in the particular embodiment are in the form of exclamation points positioned on the device 120 on either side of the device opening 128. In the particular embodiment depicted, the warning signals 132 are positioned on a forward-facing surface 134 within the channel 136 in which the cover portion 126 is slidingly disposed. Note that the warning signals 132 can take many forms, such as text and/or recognizable warning signs and/or bright colors and/or "loud" patterns, etc.

Methods of advertising according to the invention may include providing a device according to the invention in any of the embodiments previously described above, adding advertising material in the form of text and/or imagery (such as company name, company slogan, company logo, etc.) to the front of the device. The advertising material may preferably be added such that the name, slogan, and/or logo, etc., are complete and whole when the device is in a closed configuration (i.e., covering a camera lens). The methods may further include providing the device with advertising material thereon to user (which may involve distributing devices according to the invention to multiple customers and/or potential customers), along with instructions for the user on how to apply the device to an electronic device to selectively cover and uncover the camera lens thereof in the manners as described and depicted previously herein. The method may include applying the device to an electronic device at a position to cover a camera lens of the electronic device as described and depicted previously herein.

The warning indicia of a cover may take the form of modification to language and/or images on the device. For example, in a closed configuration (FIG. 15A) a device 140 may present language 142a or other indicia which communicates to a user that the device 140 is secure and is covering the camera lens 144, and in an open configuration (FIG. 15B) the device 140 may present language 142b or other indicia which communicates to a user that the device is not secure and is not covering the camera lens 144. As depicted in the particular embodiment of FIG. 15A, the word "SAFE" 142a appears on the device 140 in the closed configuration with the cover portion 146 in the closed position. When the device 140 is in the open configuration with the cover portion 146 repositioned to its open position, the additional letters "UN" 142b are revealed adjacent the device opening 148, so that the message "UNSAFE" is now presented to the user, thus communicating to the user that the camera lens 144 is uncovered.

Warning indicia may be positioned at or on various device parts which may be covered and uncovered as a device is changed from an open configuration to a closed configuration. For example, a device 150 in a closed configuration as depicted in FIG. 16A may present warning indicia such as text or imagery 152a (e.g., the word "CLOSED" as in FIG. 16A) which communicates to a user that the camera lens 154 is covered by the cover portion 156. In the particular embodiment of FIG. 16A, the warning text or imagery 152a is printed on a front-facing surface 158a within the channel 160 in which the cover portion 156 is slidingly positioned. When the cover portion 156 is moved to the open configuration as depicted in FIG. 16B (which in the particular embodiment involves sliding the cover portion 156 within its guide channel 160), the word "CLOSED" is now covered by the cover portion 156, while the camera lens 154 and device opening 162 are now uncovered. Also uncovered in the open configuration of FIG. 16B is warning indicia 152b which communicates to a user that the device is in the open configuration. In the particular embodiment of FIG. 16B, the warning indicia 152b is the word "OPEN" positioned on a front-facing surface 158b within the channel 160.

Although the invention has been described in terms of particular embodiments and applications, one of ordinary skill in the art, in light of this teaching, can generate additional embodiments and modifications without departing from the spirit of or exceeding the scope of the claimed invention. For example, dimensions given are examples, and the invention encompasses other dimensions as well. Although the above devices and methods are described for use in a particular manner, the devices and methods described herein could be used in a variety of different methods of use. As a further example, it will be recognized that the embodiments described above and aspects thereof may be modified, e.g., via changes in size and/or shape, etc., to adapt a particular situation or device to the teachings of the invention without departing from the essential scope thereof. Accordingly, it is to be understood that the drawings and descriptions of specific embodiments herein are proffered by way of example to facilitate comprehension of the invention, and should not be construed to limit the scope thereof.

That is claimed is:

1. A cover device for insuring privacy of a digital camera of an electronic device, comprising:
   a cover body having a back side and a front side, wherein the cover body is capable of flexing from a flat shape to a curved shape having a radius of curvature of 2 inches or less, wherein the cover body is biased to recoil from the curved shape to the flat shape;
   a camera opening adjacent or at least partially surrounded by the cover body;
   an adhesive on at least a portion of the back side of the cover body, wherein the adhesive is pressure-sensitive and has sufficient adhesive strength to hold the cover body in a curved shape having a radius of curvature of 2 inches or less when the cover body is applied via the adhesive to a curved surface of an electronic device; and
   a cover tab movably and slidingly secured to the cover body and configured to be slidingly moved from a closed configuration wherein the cover tab covers the camera opening to an open configuration wherein the cover tab does not visually obstruct the camera opening, wherein the cover tab is relatively rigid in comparison to the cover body such that the cover body is capable of flexing to a smaller radius of curvature than in the cover tab.

2. The cover device of claim 1, wherein the cover body is capable of flexing to a radius of curvature of 0.5 inch or less, and the adhesive has sufficient adhesive strength hold the cover body in a radius of curvature of 0.5 inches or less when the cover body is applied via the adhesive to the curved surface of the electronic device.

3. The cover device of claim 1, wherein the cover body comprises at least one material which is different from the materials of the cover tab.

4. The cover device of claim 3, wherein the cover body is formed from PVC (polyvinyl chloride), and the cover tab is formed from ABS (acrylonitrile butadiene styrene).

5. The cover device of claim 1, further comprising text and/or images on one or more front-facing surfaces of the device, wherein the text and/or images comprise warning indicia configured to convey a warning to a user about the open configuration and/or closed configuration of the device.

6. The cover device of claim 1, further comprising text and/or images on one or more front-facing surfaces of the device, wherein the text and/or images comprise advertising in the form of a company name, company slogan, or company logo.

7. A method for insuring privacy, comprising:
   providing an electronic device having a digital camera and camera lens;
   identifying the camera lens;
   providing a cover device having a back side with adhesive element thereon wherein the cover device comprises a cover base and a cover tab, wherein the cover tab is movably secured to the cover base, wherein the cover device comprises a camera opening, wherein the cover tab is adapted to be movably positioned over the camera opening of the cover device, wherein the cover tab is more rigid than is the cover base such that the cover base is capable of flexing to a radius of curvature smaller than that to which the cover tab is capable of flexing, wherein the cover base comprises a flexible portion capable of flexing to a radius of curvature of 2 inches or less, and the adhesive is capable of holding the cover base in a radius of curvature of 2 inches or less when the cover base is applied via the adhesive to a curved surface; and
   securing the cover device to the electronic device at a position over and/or adjacent the camera lens via the adhesive element, wherein securing the cover device to the electronic device comprises positioning the cover device with the camera opening over the camera lens of the electronic device.

8. The method of claim 7, further comprising:
   moving the cover tab from an open configuration where the cover tab does not visually obstruct the camera opening and camera lens to a closed configuration where the cover tab visually obstructs the camera opening and camera lens;
   moving the cover tab from the closed configuration where the cover tab visually obstructs the camera opening and camera lens to the open configuration where the cover tab does not visually obstruct the camera opening and camera lens; and
   taking photos and/or videos with the digital camera.

9. The method of claim 8, wherein the electronic device comprises a curved surface, wherein securing the cover device to the electronic device comprises flexing the flexible portion of the cover base to conform to the curved surface of the electronic device, wherein flexing the flexible portion of the cover base comprises flexing the flexible portion to a radius of curvature of 2 inches or less.

10. The method of claim 9, wherein the cover base flexible portion is capable of flexing to a radius of curvature of 0.5 inches or less, and the adhesive has sufficient adhesive strength to hold the cover base in a radius of curvature of 0.5 inches or less when the cover base is applied via the adhesive to a curved surface of an electronic device, wherein flexing the flexible portion of the cover base comprises flexing the flexible portion to a radius of curvature of 0.5 inches or less.

11. The method of claim 8, wherein the cover base is comprises at least one material which is different from the materials of the cover tab.

12. The method of claim 11, wherein the cover base is formed from PVC (polyvinyl chloride), and the cover tab is formed from ABS (acrylonitrile butadiene styrene).

13. A cover device for insuring privacy of a digital camera of an electronic device, comprising:

a cover body having a back side and a front side, wherein the cover body is flexible and is capable of and adapted to be flexed from a flat shape to a curved shape having a radius of curvature of 2 inches or less;

a camera opening adjacent to or surrounded by the cover body;

an adhesive on at least a portion of the back side of the cover body; and a cover tab movably and slidingly secured to the cover body and adapted to be slidingly moved from a closed configuration wherein the cover tab covers the camera opening to an open configuration wherein the cover tab does not visually obstruct the camera opening, wherein the cover tab is more rigid than the cover body such that the cover body is capable of flexing to a smaller radius of curvature than is the cover tab.

14. The cover device of claim 13, wherein the cover body is biased to recoil from the curved shape to the flat shape, and wherein the adhesive has sufficient adhesive strength to hold the cover body in a radius of curvature of 2 inches or less when the cover body is applied via the adhesive to a curved surface of an electronic device.

15. The cover device of claim 14, wherein the cover body is capable of flexing to a radius of curvature of 0.5 inch or less, and the adhesive has sufficient adhesive strength to hold the cover body in a radius of curvature of 0.5 inches or less when the cover body is applied via the adhesive to the curved surface of the electronic device.

16. The cover device of claim 14, wherein cover tab comprises a tab knob extending outwardly from a front face of the cover tab, wherein the tab knob extends beyond any portion of the cover base in a direction outwardly from the front side of the cover base, wherein the tab knob is adapted to be engaged by a finger of a user in order to push the cover tab from the closed configuration to the open configuration.

17. The cover device of claim 13, wherein the cover body is formed from a different material than the cover tab.

18. The cover device of claim 17, wherein the cover body is formed from PVC (polyvinyl chloride), and the cover tab is formed from ABS (acrylonitrile butadiene styrene).

* * * * *